(12) United States Patent
Schiffmann et al.

(10) Patent No.: US 7,777,618 B2
(45) Date of Patent: Aug. 17, 2010

(54) COLLISION DETECTION SYSTEM AND METHOD OF ESTIMATING TARGET CROSSING LOCATION

(75) Inventors: Jan K. Schiffmann, Newbury Park, CA (US); Sandeep D. Punater, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 12/072,239

(22) Filed: Feb. 25, 2008

(65) Prior Publication Data

US 2008/0272958 A1 Nov. 6, 2008

Related U.S. Application Data

(62) Division of application No. 10/780,845, filed on Feb. 18, 2004, now Pat. No. 7,369,941.

(51) Int. Cl.
*B60Q 1/00* (2006.01)
*G06F 19/00* (2006.01)

(52) U.S. Cl. ................... 340/436; 340/435; 342/70; 701/301

(58) Field of Classification Search .............. 701/301, 701/96, 300; 340/903, 435, 436, 901, 902; 180/169; 342/72, 107, 70, 59, 118, 71; 73/510
See application file for complete search history.

(56) References Cited

U.S. PATENT DOCUMENTS

| | | | | |
|---|---|---|---|---|
| 4,703,429 A * | 10/1987 | Sakata | ................... | 701/96 |
| 6,067,031 A * | 5/2000 | Janky et al. | ................ | 340/903 |
| 6,067,038 A * | 5/2000 | Uehara et al. | ................ | 342/70 |
| 6,087,928 A * | 7/2000 | Kleinberg et al. | ........... | 340/436 |
| 6,434,461 B1 * | 8/2002 | Jacob et al. | ................... | 701/45 |
| 6,628,227 B1 * | 9/2003 | Rao et al. | ................... | 342/70 |
| 6,873,251 B2 * | 3/2005 | Schiffmann et al. | ......... | 340/436 |
| 7,009,500 B2 * | 3/2006 | Rao et al. | .................. | 340/435 |
| 7,592,945 B2 * | 9/2009 | Colburn et al. | ................ | 342/70 |
| 2002/0176605 A1 * | 11/2002 | Stafsudd et al. | ............. | 382/106 |

* cited by examiner

*Primary Examiner*—Khoi Tran
*Assistant Examiner*—Ronnie Mancho
(74) *Attorney, Agent, or Firm*—Thomas N. Twomey (57) ABSTRACT

A collision detection system and method of estimating a crossing location are provided. The system includes a first sensor for sensing an object in a field of view and sensing a first range defined as the distance between the object and the first sensor. The system also includes a second sensor for sensing the object in the field of view and sensing a second range defined by the distance between the object and the second sensor. The system further includes a controller for processing the first and second range measurements and estimating a crossing location of the object as a function of the first and second range measurements. The crossing location is estimated using range and range rate in a W-plane in one embodiment and using a time domain approach in another embodiment.

5 Claims, 5 Drawing Sheets

COLLISION DETECTION SYSTEM AND METHOD OF ESTIMATING TARGET CROSSING LOCATION

This application is a divisional and claims priority from U.S. patent application Ser. No. 10/780,845 filed Feb. 18, 2004 now U.S. Pat. No. 7,369,941.

TECHNICAL FIELD

The present invention generally relates to object collision detection and, more particularly, relates to a collision detection system and method of estimating the crossing location of the object.

BACKGROUND OF THE INVENTION

Automotive vehicles are increasingly being equipped with collision avoidance and warning systems for predicting potential collisions with external objects, such as another vehicle or a pedestrian. Upon detecting a potential collision, such systems are capable of initiating an action to avoid the collision, minimize impact with the object, and/or provide a warning to the vehicle operator. Adaptive cruise control systems have been proposed to track a leading vehicle and automatically control the speed of the following vehicle. The ability to accurately predict an upcoming collision also enables a vehicle controller to control and deploy safety-related devices on the host vehicle. For example, upon predicting an anticipated collision or near collision with an object, the vehicle seat belt pretensioner could be activated in a timely manner to pretension the seat belt, or the air bag system could be readied for quicker activation, thereby enhancing the application of the safety devices. The controller could also deploy a warning signal to notify the vehicle driver of a predicted collision with an object.

In some vehicle target tracking systems, the host vehicle is generally equipped with a sensor arrangement that acquires range, range rate, and azimuth angle (i.e., direction to target) measurements for each tracked target within a field of view. The sensor arrangement employed in such conventional systems generally requires a relatively complex and expensive sensor arrangement employing multiple sensors that are required to measure the azimuth angle of the object, relative to the host vehicle, in addition to obtaining range and range rate measurements of the object. It is generally desirable to reduce the complexity and cost of systems and components employed on automotive vehicles to provide a cost affordable vehicle to consumers.

It has been proposed to reduce the complexity and cost of a vehicle collision detection system by employing a single radar sensor that provides range and range rate measurements of an object and estimates the miss distance of the object. One such approach is disclosed in U.S. Pat. No. 6,615,138, and entitled "COLLISION DETECTION SYSTEM AND METHOD OF ESTIMATING MISS DISTANCE EMPLOYING CURVE FITTING." The entire disclosure of the aforementioned patent is hereby incorporated herein by reference. Another approach is disclosed in U.S. application Ser. No. 10/158,550, filed on May 30, 2002, and entitled "COLLISION DETECTION SYSTEM AND METHOD OF ESTIMATING MISS DISTANCE." The entire disclosure of the aforementioned application is hereby incorporated herein by reference. While the aforementioned approaches employing a single radar sensor are well suited to estimate the miss distance of an object, additional information such as the crossing location with respect to the vehicle is generally not available.

In some situations, it may be desirable to determine the crossing location of the object with respect to the host vehicle, such as a location on the vehicle front bumper that the object is expected to come into contact with. By knowing the location of the expected collision, countermeasures can be initiated based on the anticipated crossing location.

It is therefore desirable to provide for a vehicle collision detection system that estimates the crossing location of an object. It is further desirable to provide for a reduced complexity and cost affordable vehicle collision detection system that estimates crossing location of an object.

SUMMARY OF THE INVENTION

In accordance with the teachings of the present invention, a collision detection system and method of estimating a crossing location of an object are provided. According to one aspect of the present invention, the collision detection system includes a first sensor for sensing an object in a field of view and measuring a first range defined as the distance between the object and the first sensor. The system also includes a second sensor for sensing the object in the field of view and measuring a second range defined by the distance between the object and the second sensor. The system further includes a controller for processing the first and second range measurements and estimating a crossing location of the object as a function of the first and second range measurements.

According to another aspect of the present invention, a method of estimating a crossing location of an object is provided. The method includes the steps of sensing the presence of an object in a field of view, tracking the object with first and second sensors, measuring range to the object with the first sensor, and measuring range to the object with the second sensor. The first and second sensors are separate from each other. The method further includes the step of estimating a crossing location of the object as a function of the range measurement with the first and second sensors.

Accordingly, the collision detection system and method of estimating target crossing location of the present invention advantageously estimates the crossing location of an object without requiring a complex and costly sensor arrangement. By knowing the target crossing location, the present invention advantageously allows for enhanced countermeasures to be employed on a vehicle.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
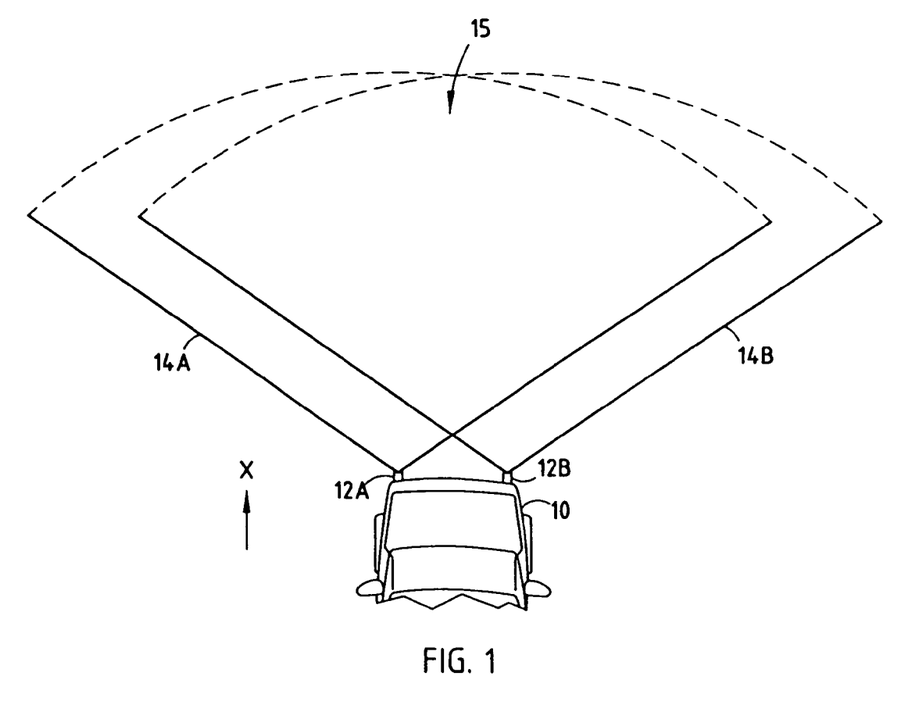
FIG. 1 is a plan view illustrating the geometry of a collision detection system employing two sensors on a vehicle according to the present invention.

Referring to FIG. 1, an automotive vehicle 10 is generally illustrated having a collision detection system for detecting and tracking an object, and detecting the potential for a collision with the object. The collision detection system includes first and second radar sensors 12A and 12B mounted to the host vehicle 10 to cover a desired field of view in front of the vehicle 10. The vehicle collision detection system senses and tracks one or more objects, such as a moving target, and estimates a crossing location of the target object relative to a baseline axis of the vehicle 10. Using the estimated crossing location of the object, the collision detection system is able to detect an anticipated collision of the target object 16 with the host vehicle 10, thereby allowing for responsive countermeasure action(s) to be taken.

The sensor arrangement includes the first and second sensors 12A and 12B mounted on opposite sides of the front bumper of vehicle 10, according to one embodiment. The first radar sensor 12A senses objects in a first field of view 14A, and the second sensor 12B senses objects in a second field of view 14B. The first and second field of views 14A and 14B substantially overlap to provide a common coverage zone field of view 15. Sensors 12A and 12B sense the presence of one or more objects in field of view 15, track relative movement of each of the sensed objects within field of view 15, and measure the range (radial distance) to the target object from each sensor. Additionally, sensors 12A and 12B may further measure the range rate (time rate of change of radial distance) of the target object.

Figure 2:
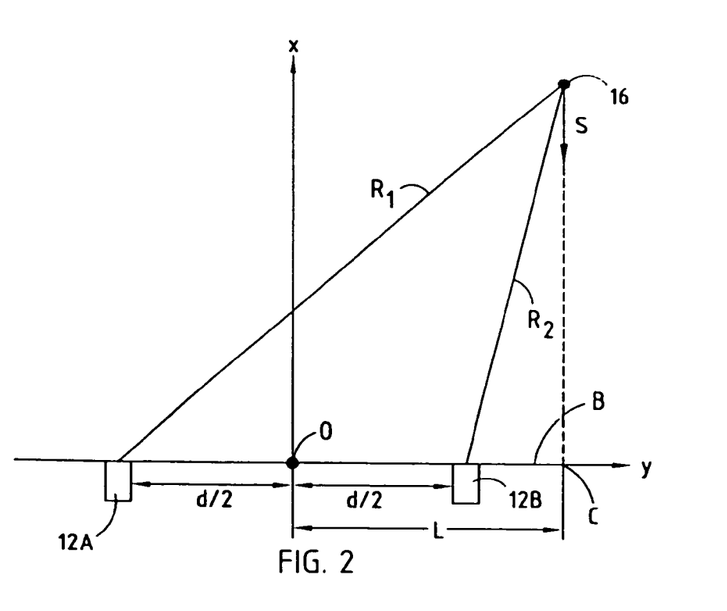
FIG. 2 is a plan view further illustrating the geometry of the detection system shown tracking a target object.

Referring to FIG. 2, the first and second sensors 12A and 12B are shown separated from each other by a distance d and aligned on a baseline B extending through sensors 12A and 12B along the y-axis. An x-axis is shown extending through a center point O midway between sensors 12A and 12B, orthogonal to the y-axis. A target object 16 is illustrated and is assumed to have a relative velocity vector (relative to the vehicle) parallel to the longitudinal axis (X-axis) of the vehicle 10 as shown by speed vector S. First sensor 12A senses the range $R_1$ defined as the radial distance between first sensor 12A and object 16. The first sensor 12A may also sense the range rate $\dot{R}_1$ as the measured rate of change of range $R_1$ of the object 16 as a function of time relative to the host vehicle 10. Second sensor 12B measures range $R_2$ defined as the radial distance between second sensor 12B and target object 16. The second sensor 12B may likewise measure the range rate $\dot{R}_2$ as the measured rate of change of the range $R_2$ of the object 16 as a function of time relative to the host vehicle 10. Alternately, the range rates $\dot{R}_1$ and $\dot{R}_2$ may be determined by computing the time rate of change (i.e., derivative) of the corresponding sensed ranges $R_1$ and $R_2$, respectively.

The first and second sensors 12A and 12B may each include a commercially available off-the-shelf wide-beam staring microwave Doppler radar sensor. However, it should be appreciated that other object detecting sensors including other types of radar sensors, video imaging cameras, and laser sensors may be employed to detect the presence of an object, track the relative movement of the detected object, and determine the range measurements $R_1$ and $R_2$, and range rate measurements $\dot{R}_1$ and $\dot{R}_2$ that are processed according to the present invention. The target object 16 is shown having an estimated crossing of the baseline B at a location C with a crossing location distance L from center point O. The crossing location distance L can also be expressed as the distance from the point O midway between sensors 12A and 12B (e.g., center of bumper) and crossing location C.

The collision detection system and method of the present invention advantageously estimates the crossing location C of the target object 16 as a function of range and range rate measurements, without the requirement of acquiring an azimuth angle measurement of the object 16. Thus, the collision detection system of the present invention is able to use a reduced complexity and less costly sensing arrangement, while obtaining a crossing location C estimation. While a pair of sensors 12A and 12B are shown, it should be appreciated that any number of two or more sensors may be employed to estimate the crossing location C of one or more target objects.

In order to track object 16 in coverage zone 15, the collision detection system may assume that the object 16 is a point reflector having a relative velocity vector S substantially parallel to the longitudinal axis of the vehicle 10, which is the anticipated axis of travel of the vehicle 10. The crossing location C is the signed lateral coordinate of the target object 16 where the object 16 is expected to cross the sensor baseline B (the line passing through the two sensors 12A and 12B along the y-axis). In the embodiment where the two sensors 12A and 12B are mounted on opposite sides of the front bumper of a host vehicle 10, the side of the vehicle 10 to be affected by a potential collision can be determined based on the estimated crossing location C.

Based on the assumption that the target object 16 is assumed to have a relative velocity vector which is roughly parallel to the host vehicle 10 longitudinal axis, the following equation defines the crossing location $$C = \frac{R_1^2 - R_2^2}{2d}$$

The crossing location C is determined as the distance midway between sensors 12A and 12B to the crossing point on baseline B. The crossing location C of the target object 16 is determined as described herein according to first and second embodiments of the present invention.

Figure 3:
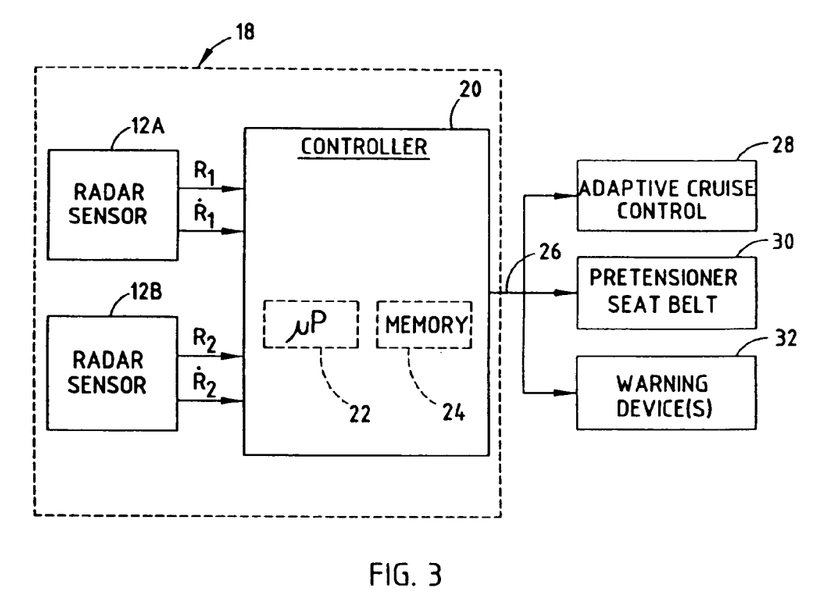
FIG. 3 is a block diagram illustrating the collision detection system.

Referring to FIG. 3, the collision detection system 18 is shown including radar sensors 12A and 12B and a controller 20. Controller 20 preferably includes a microprocessor-based controller having microprocessor 22 and memory 24. Memory 24 may include random access memory (RAM), read-only memory (ROM), and electrically erasable programmable read-only memory (EEPROM). Controller 20 may be a commercially available off-the-shelf controller and may be dedicated to any one or more of target tracking, adaptive cruise control, and crash processing, according to some examples, or may share processing capability with other vehicle functions.

The controller 20 receives the range measurement $R_1$ and range rate measurement $\dot{R}_1$ from first radar sensor 12A, and likewise receives the range measurement $R_2$ and range rate measurement $\dot{R}_2$ from the second radar sensor 12B. Controller 20 processes the received range measurements $R_1$ and $R_2$ and range rate measurements $\dot{R}_1$ and $\dot{R}_2$ with a crossing location estimation routine according to the present invention. The controller 20 may further process the estimated crossing location estimation C to initiate countermeasures.

The controller 20 generates an output signal 26 in the event that an anticipated vehicle collision has been determined. The output signal 26 may be supplied as an input to one or more devices in the vehicle, such as an adaptive cruise control system 28, seat belt pretensioner 30, and one or more warning devices 32. The adaptive cruise control system 28 may employ the estimated crossing location C of object 16 to control speed of the host vehicle 10. The seat belt pretensioner may be controlled to pretension the seat belt just prior to an anticipated vehicle collision to eliminate slack in the restraining device, and may deploy only certain restraining devices based on the estimated crossing location C. The one or more warning devices 30 may be employed to warn the vehicle operator and occupants of an anticipated vehicle collision and the estimated location C of impact on the host vehicle 10. It should be appreciated that other devices may be deployed responsive to signal 26 including vehicle air bags, pop-up roll bars, as well as other safety-related devices.

Figure 4:
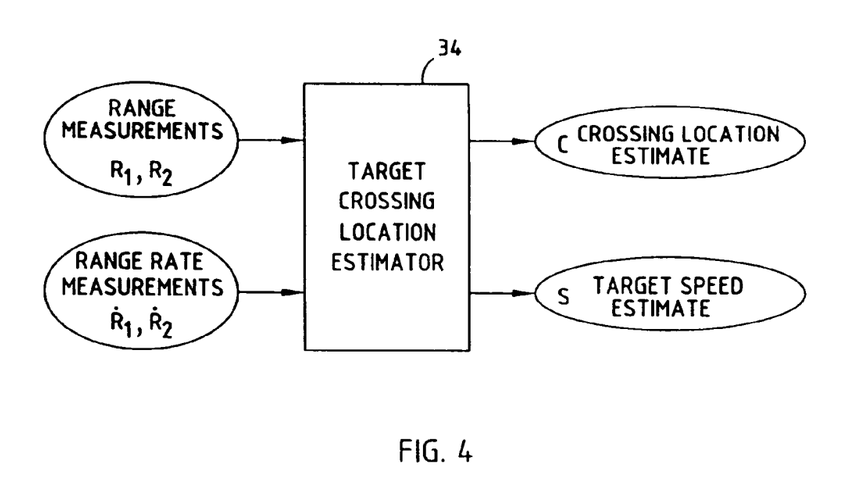
FIG. 4 is a block diagram illustrating the target crossing location estimator of the collision detection system.

Referring to FIG. 4, a target crossing location estimator 34 is generally shown receiving the range measurements $R_1$ and $R_2$ and range rate measurements $\dot{R}_1$ and $\dot{R}_2$, generated by first and second sensors 12A and 12B. The range and range rate measurements $R_1$ and $R_2$ and $\dot{R}_1$ and $\dot{R}_2$ are processed by the estimator 34, which includes a programmed routine 40 estimating a crossing location C of the object relative to the baseline B of the sensors 12A and 12B. Further, the estimator 34 may estimate target speed S of the target object.

The crossing location estimation of the present invention assumes that the target object is moving straight and at a constant speed generally parallel to the longitudinal axis of the host vehicle 10. The crossing location estimation assumes that the target object 16 is a point reflector having a velocity vector relative to the host vehicle 10 that is substantially parallel to the vehicle longitudinal axis.

Figure 5:
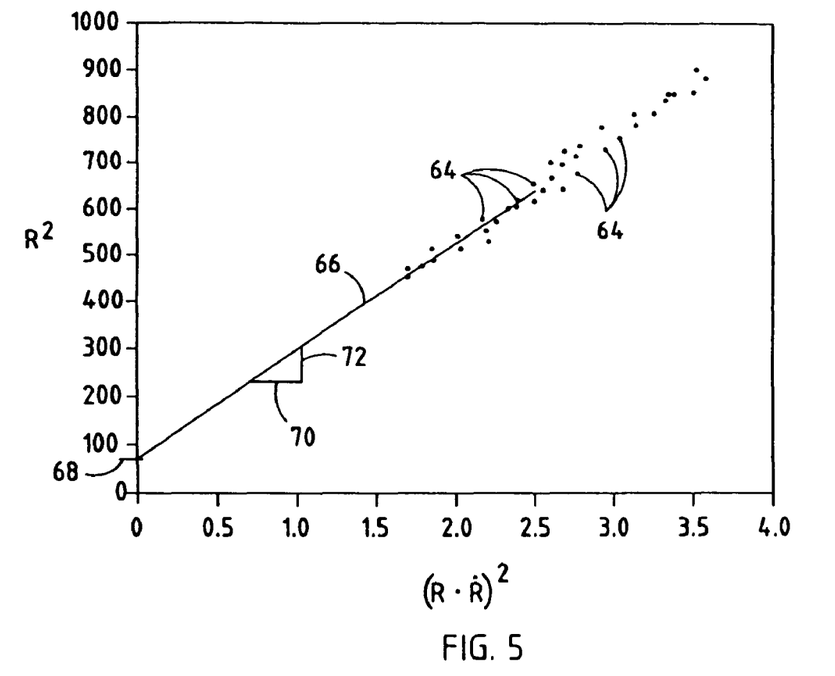
FIG. 5 is a graph illustrating sensed data plotted in a curve in a W-plane.

Referring to FIG. 5, the W-plane is shown as a plane having data plotted on horizontal and vertical coordinates for data measured with one of sensors 12A and 12B. While data from one of sensors 12A and 12B is shown in FIG. 5, it should be appreciated that data from both sensors 12A and 12B is processed. The vertical coordinate represents the squared range $R^2$ values, while the horizontal coordinate represents the squared product of range and range rate $(R \cdot \dot{R})^2$ values. The pairs of computed values for each of data measurements may be plotted in the W-plane as shown by points 64 for X number of measurements taken with each of sensors 12A and 12B. A least-squares fit line 66 is generated based on a close fit to the plurality of plotted measurements 64.

While a least-squares fit line is shown and described herein in connection with the W-plane, it should be appreciated that other curves, both linear and non-linear, may be defined based on the pairs of data for N measurements 64, without departing from the teachings of the present invention. Further, while a plot is shown in the W-plane, it should be appreciated that the controller 20 may process the data measured via first and second sensors 12A and 12B without providing a viewable plot, as the plot is merely illustrative of the processing of the data provided by a microprocessor-based controller 20.

The speed S may be estimated from an interpretation of the fitted curve 66.

$$\frac{1}{S^2}$$

represents the slope of curve 66 as defined by horizontal segment 70 and vertical segment 72. Accordingly, the speed S of the object relative to the host vehicle may be estimated based on the slope of curve 66. While a straight line curve 66 is shown in FIG. 5, it should be appreciated that some higher-order curve may be employed to define the relationship of the sample points.

The collision detection system of the present invention advantageously estimates the crossing location C of the target object 16, which is the location at which the object is estimated to cross the baseline B of the first and second sensors 12A and 12B. According to one embodiment, the crossing location C is determined from a point O midway between the two sensors 12A and 12B. By estimating the crossing location C of the object 16, the controller 20 is able to estimate where the target object 16 may impact the host vehicle 10. This enables the controller 20 to take pre-emptive action such as to avoid the accident and/or initiate certain devices in anticipation of a collision at the estimated crossing location C. The estimated crossing location C of the object 16 is estimated according to a first embodiment shown in FIGS. 6 and 7, and according to a second embodiment shown in FIGS. 8 and 9.

Figure 6:
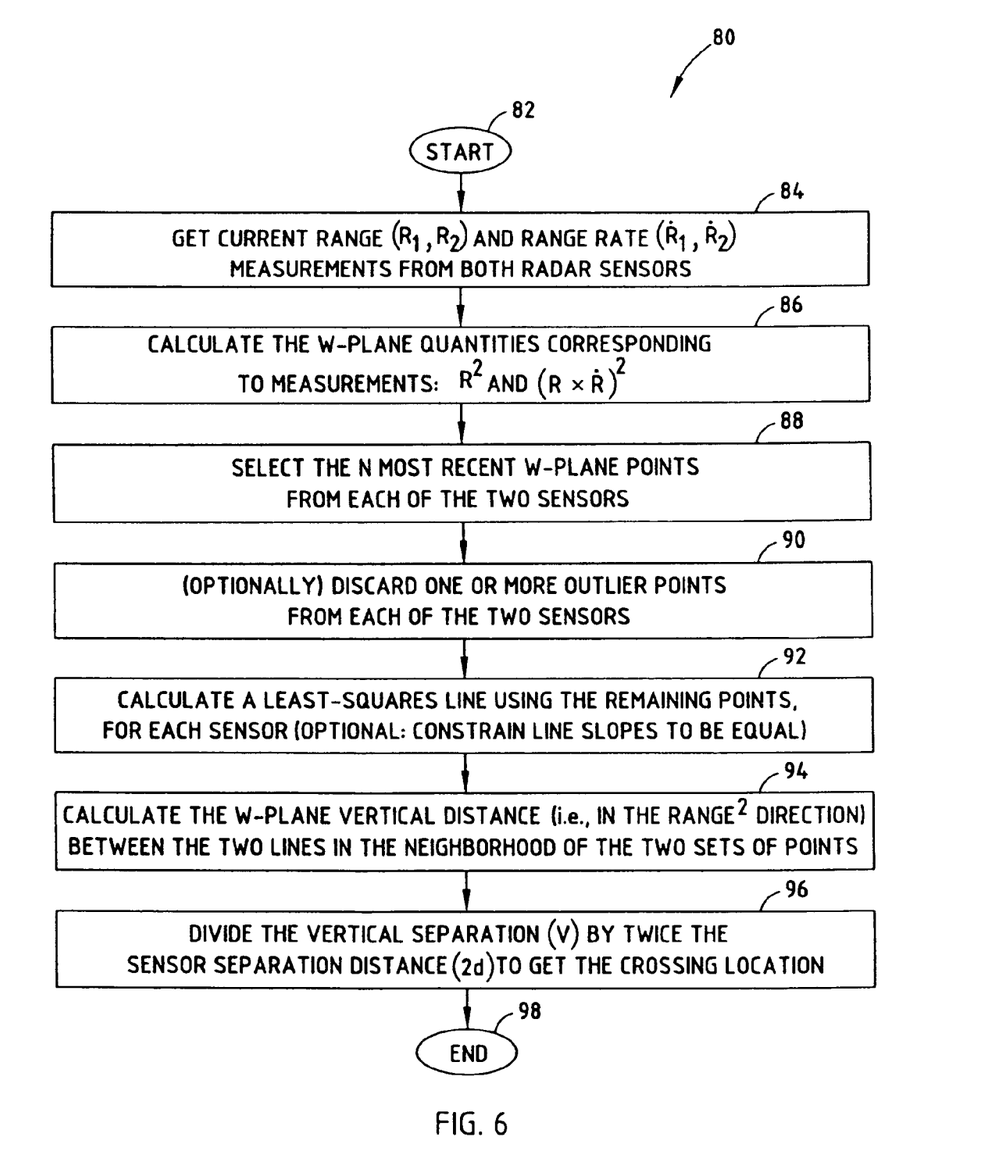
FIG. 6 is a flow diagram illustrating a routine for estimating the crossing location of the target object using the W-plane according to the first embodiment of the present invention.
Figure 7:
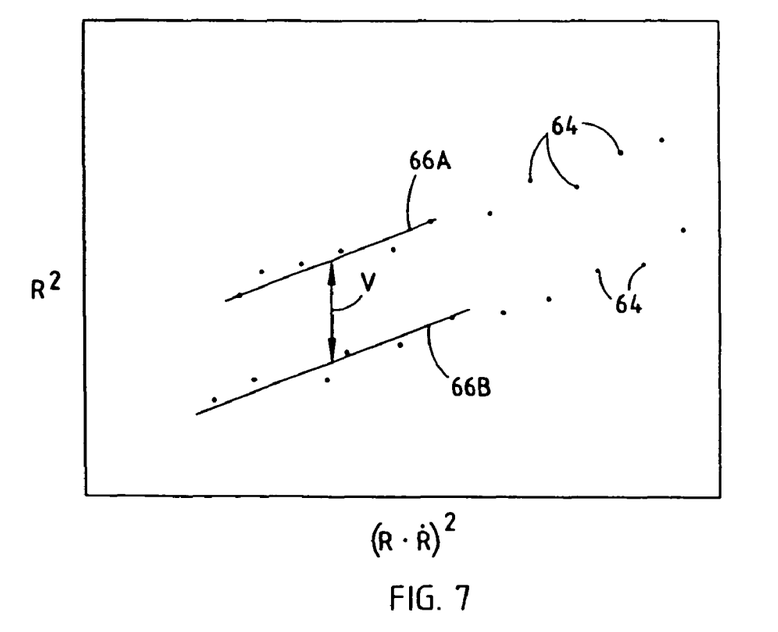
FIG. 7 is a graph illustrating estimation of the target crossing location according to the first embodiment of the present invention.

Referring to FIG. 6, a routine 80 for estimating the crossing location C of a target object is shown according to the first embodiment of the present invention. Routine 80 employs the data plotted in the W-plane for both of sensors 12A and 12B. One example of data plotted in the W-plane for both of sensors 12A and 12B is shown in FIG. 7. As seen in FIG. 7, a least-squares line 66A is drawn through the data representing measurements taken with the first sensor 12A. Likewise, a least-squares line 66B is determined with respect to the data representing measurements taken with the second sensor 12B.

Routine 80 begins at step 82 and proceeds to get the current range measurement $R_1$ and $R_2$ and range rate measurements $\dot{R}_1$ and $\dot{R}_2$ sensed by first and second radar sensors in step 84. Routine 80 may associate data with the particular target object by way of an object tracker. The object tracker tracks each object based on the combination of range and range rate measurements taken with each of first and second sensors 12A and 12B. If the current range and range rate measurements are sufficiently close in value to the predicted range and range rate values, the object measurement data is assumed to pertain to the same object. The tracking of each detected object with each sensor allows for a consistent stream of measurement data at incremental time periods k, k+1, k+2, etc. for each sensed object.

In step 86, the W-plane quantities corresponding to measurements for each of the first and second sensors are calculated which include the W-plane quantities of $R^2$ and $(R \cdot \dot{R})^2$ in step 86. In step 88, routine 80 selects the N most recent W-plane points from data measured with each of the two sensors 12A and 12B. The squared range and squared product of range and rate values, $R^2$ and $(R \cdot \dot{R})^2$, respectively, for each of N measurements taken by each of first and second sensors 12A and 12B are preferably stored in memory and are processed by controller 20 as explained herein. It should be appreciated that the number (N) of measurements may include thirty, according to one example, or may include fewer or greater number of measurements for each of the sensors 12A and 12B. The processing of a greater number of measurements may result in less noise, but may be less responsive to maneuvers between the object and the host vehicle. Accordingly, the number (N) of measurements from each of first and second sensors 12A and 12B that are processed is a compromise and may vary depending on the application.

Routine 80 may include optional step 90 of discarding one or more outlier data points from each of the two sensors. The outlier removal enhancement may remove one or more data points from each window, after identifying them as being in substantial disagreement with the other data points of the window. This is done before calculating the least-squares line for each window.

Proceeding to step 92, routine 80 calculates a least-squares line for each sensor using the remaining data points in each window. That is, the data measured with sensor 12A is used to calculate a first least-squares line 66A, while the data measured with sensor 12B is used to calculate a second least-squares line 66B. The least-squares lines 66A and 66B corresponding to the first and second sensors 12A and 12B, respectively, which are shown in one example in FIG. 7, may be adjusted to constrain the slope of the lines 66A and 66B to be equal to one another. By constraining the two least-squares line 66A and 66B to have the same slope, enhanced accuracy of the crossing location estimation can be achieved. The slope of the W-plane trace is the inverse of the target's relative speed squared. Because of this relationship, if the data from two sensors tracking the same point target are plotted in the W-plane, the resulting traces should be parallel.

Next, in step 94, routine 80 calculates the W-plane vertical distance V which is the vertical distance between the two lines 66A and 66B in the neighborhood (window) of the two sets of points for the corresponding two sensors. The vertical distance V is preferably taken near the center of the windowed lines 66A and 66B. In step 96, routine 80 divides the vertical separation V by twice the separation distance 2d of sensors 12A and 12B to obtain the crossing location C. According to the embodiment shown, the crossing location C is determined relative to the point O midway between the two sensors 12A and 12B.

According to one example, if line 66B corresponding to sensor 12B is below lines 66A corresponding to sensor 12A, then the crossing location C of the target object 16 is negative, that is, it is on the driver side of the vehicle, according to one arrangement. Thus, if line 66A corresponding to sensor 12A is below line 66B corresponding to sensor 12B, then the crossing location C of the target object 16 is positive, that is, it is on the passenger side of the vehicle, as compared to the driver side. By knowing which side of the vehicle the object is expected to collide with, enhanced countermeasures can be initiated.

The first embodiment employing the vertical separation technique in the W-plane may be generally less sensitive to maneuvers and accelerations. In this approach, only the vertical separation is required to estimate the crossing location, and since the two ideal measurement curves 66A and 66B are similarly shaped, any ill effects of the fitted lines approximately cancel out. Additionally, the W-plane approach is generally insensitive to any distributed nature of the target.

Figure 8:
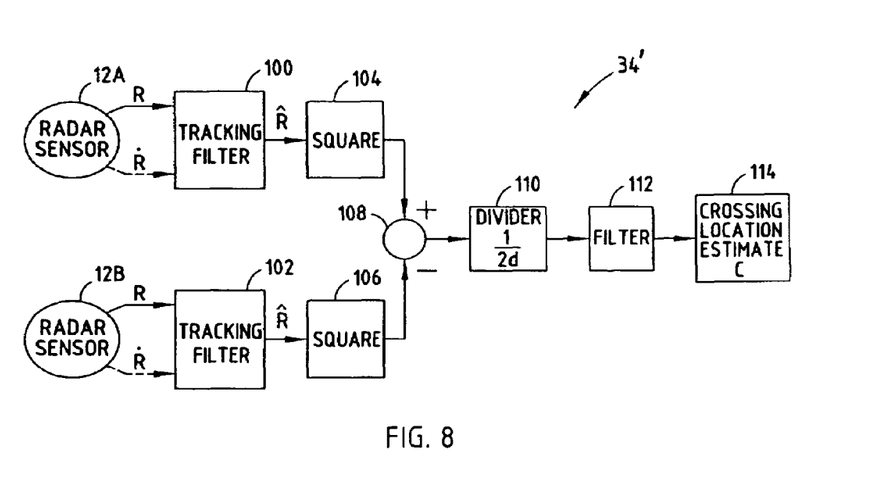
FIG. 8 is a block diagram illustrating a time-domain approach to estimating the crossing location of a target object according to a second embodiment of the present invention.
Figure 9:
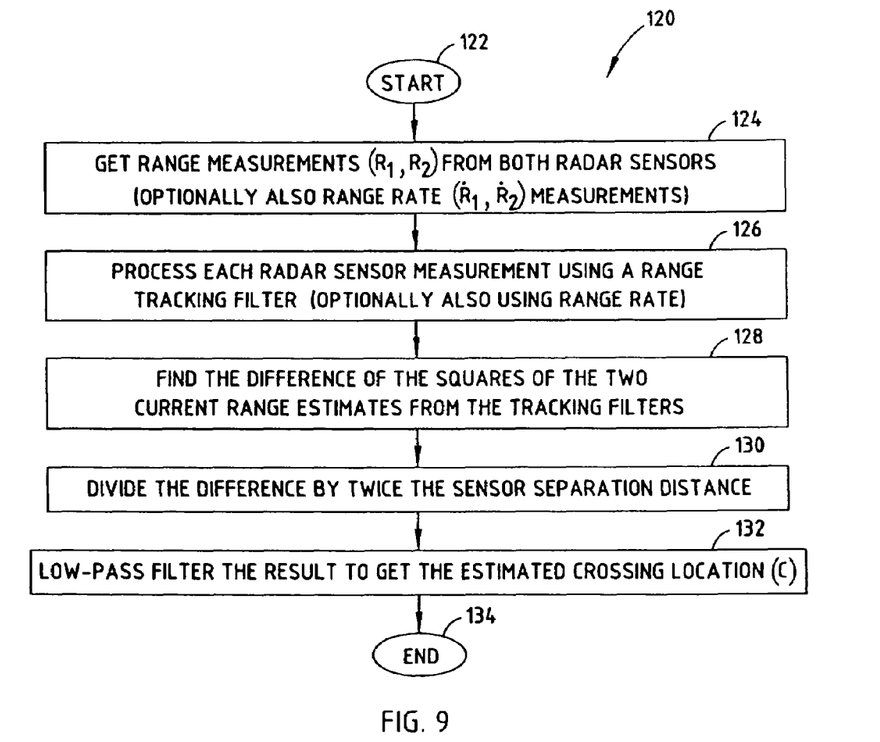
FIG. 9 is a flow diagram illustrating a routine for estimating the target crossing location according to the second embodiment of the present invention.

Referring to FIGS. 8 and 9, a time-domain approach to estimating the crossing location C of a target object 16 is shown according to the second embodiment of the present invention. The time-domain approach to estimating the crossing location employs an estimator 34' having tracking filters 100 and 102 coupled to corresponding radar sensors 12A and 12B to produce a range R estimate for each sensor. The tracking filters 100 and 102 may also receive range rate $\dot{R}$; however, the tracking filters 100 and 102 may operate without range rate. The estimator 34' further includes mathematical square functions 104 and 106 for calculating the mathematical square of the outputs of tracking filters 100 and 102, respectively. A subtractor 108 computes the difference between the outputs of square functions 104 and 106. Additionally, estimator 34' employs a divider 110 for dividing the computed difference by twice the separation distance (2d) of sensors 12A and 12B. The output of divider 110 is applied to a low pass filter 112 to provide the crossing location estimate C in block 114.

Referring to FIG. 9, a routine 120 is shown for estimating the crossing location C of a target object employing estimator 34' according to the second embodiment. Routine 120 begins at step 122 and proceeds to step 124 to get the range measurements $R_1$ and $R_2$ from both radar sensors 12A and 12B. Optionally, range rate $\dot{R}_1$ and $\dot{R}_2$ measurements may also be obtained. Proceeding to step 126, routine 120 processes each set of radar sensor measurements from sensors 12A and 12B using the range tracking filters 100 and 102, respectively. The filters 100 and 102 may optionally also use the range rate measurements $\dot{R}_1$ and $\dot{R}_2$ which may offer enhanced estimation of the crossing location.

Next, routine 120 proceeds to step 128 to find the difference of the squares of the two current range estimates from the tracking filters. This is performed by the subtractor 108. Next, in step 130, routine 120 divides the difference by twice the sensor separation distance 2d. In step 132, the divided difference is low pass filtered to get the estimated crossing location C. Routine 120 is then completed in step 134.

The time-approach estimation 34' advantageously does not require range rate measurements from sensors 12A and 12B to obtain an estimation of the crossing location C. If sufficient range rate information is available from sensors 12A and 12B, such range rate information may advantageously enhance the tracking filter processing.

Accordingly, the collision detection system of the present invention advantageously estimates the crossing location C in a simplified and cost affordable system. The present collision detection system quickly estimates the crossing location C much faster than prior known approaches. Additionally, the collision detection system of the present invention handles maneuvers and accelerations better than prior known single-sensor approaches. By quickly and accurately determining the crossing location C of an object with respect to the host vehicle 10, the system is able to quickly initiate countermeasures which may occur based on the estimated location of a potential collision.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A method of estimating a crossing location of an object, said method comprising the steps of:
   sensing the presence of an object in a field of view;
   tracking the object with first and second sensors;
   measuring range to the object with the first sensor;
   measuring range to the object with the second sensor, wherein the first and second sensors are separate from each other;

determining a first range rate of the object with the first sensor, and determining a second range rate of the object with the second sensor;

computing a mathematical square of range and a mathematical square of the product of range and range rate for each of the plurality of measurements taken with the first sensor and generating a first curve as a function thereof;

computing a mathematical square of range and a mathematical square of the product of range and range rate for each of the plurality of measurements taken by the second sensor and generating a second curve as a function thereof; and estimating the crossing location of the object as a function of the first and second curves.

2. The method as defined in claim 1, wherein the crossing location is estimated relative to a location midway between the first and second sensors.

3. The method as defined in claim 1, wherein the step of estimating the crossing location of the object as a function of the first and second curves comprises computing the distance between the first and second curves and dividing the distance by twice the separation distance of the first and second sensors to estimate the crossing location relative to a location midway between the first and second sensors.

4. The method as defined in claim 1, wherein the method estimates the crossing location of the object relative to a vehicle.

5. The method as defined in claim 4, further comprising the step of generating a collision output signal as a function of the estimated crossing location.

* * * * *